(No Model.) 4 Sheets—Sheet 1.
J. B. HAMMOND.
TYPE WRITING MACHINE.
No. 494,742. Patented Apr. 4, 1893.
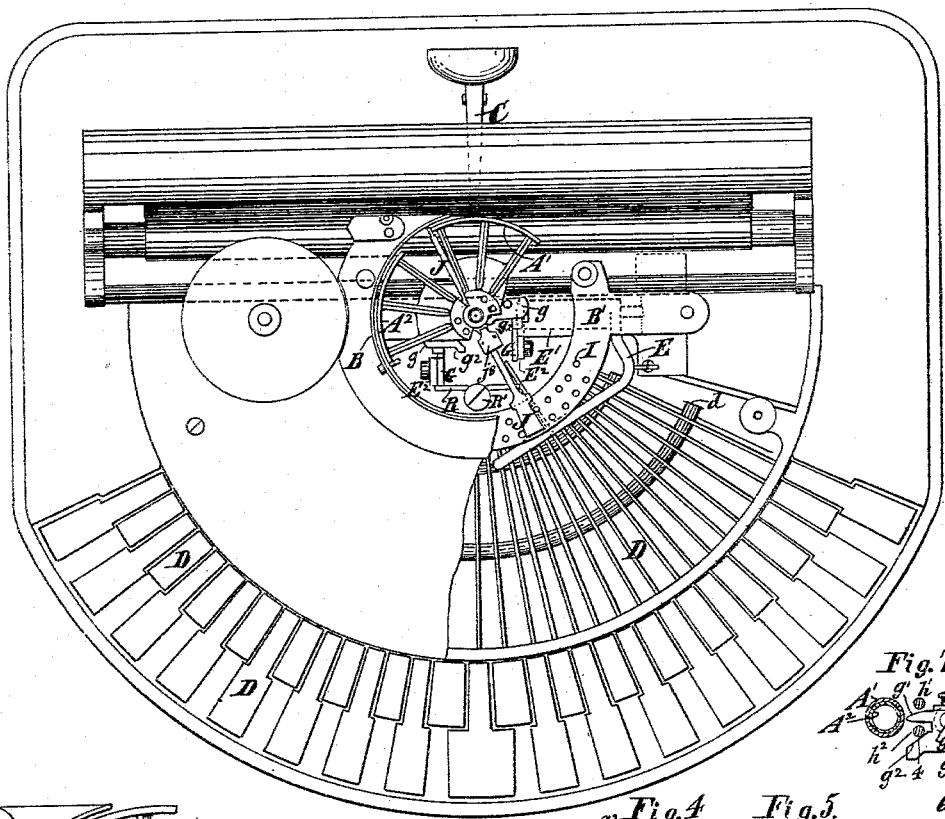
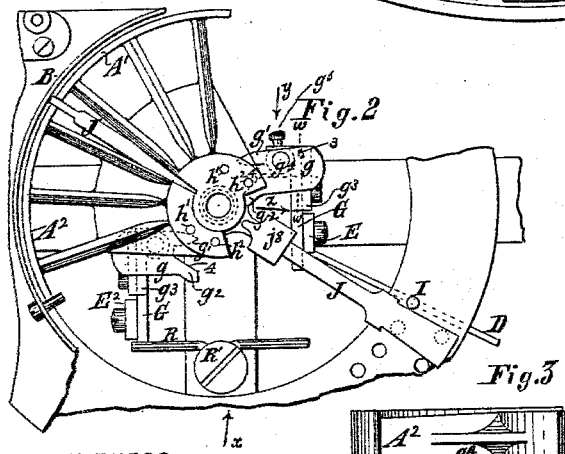
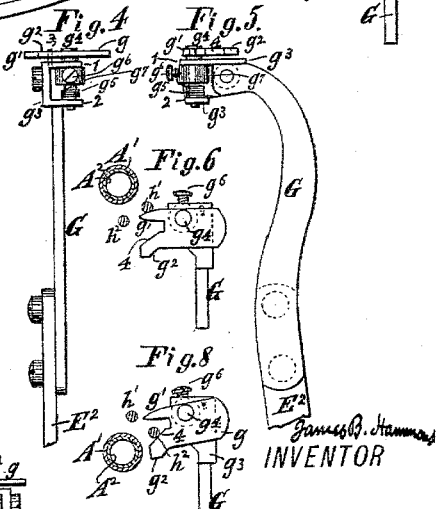
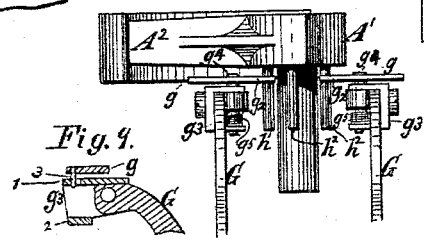
WITNESS:
C. R. Ferguson
W. M. Iliff
INVENTOR
James B. Hammond
BY Gifford & Brown
HIS ATTORNEYS (No Model.) 4 Sheets—Sheet 2.

J. B. HAMMOND.
TYPE WRITING MACHINE.

No. 494,742. Patented Apr. 4, 1893.

WITNESSES:

James B. Hammond
INVENTOR

BY Gifford & Brown
HIS ATTORNEYS

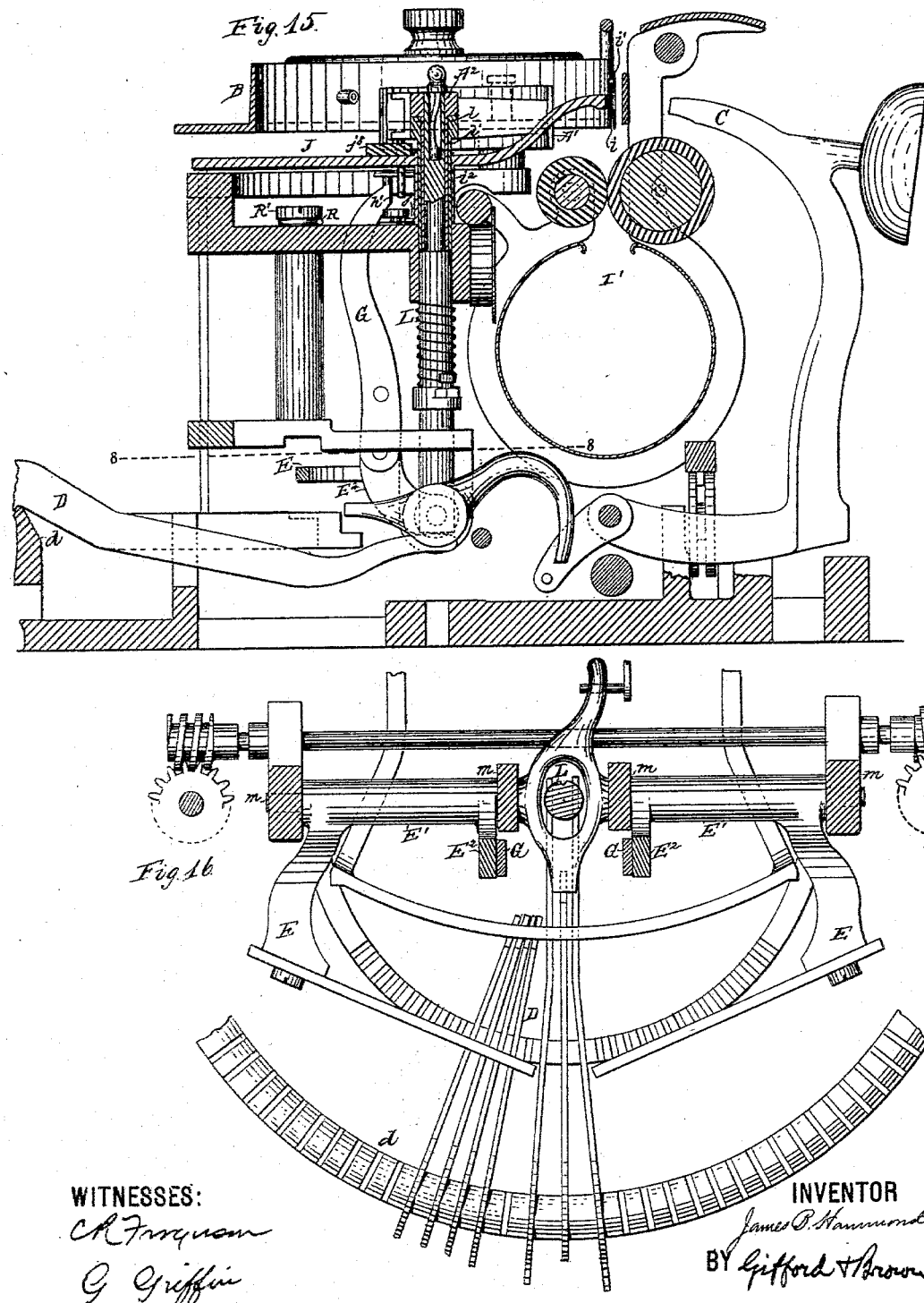

(No Model.) 4 Sheets—Sheet 4.
J. B. HAMMOND.
TYPE WRITING MACHINE.
No. 494,742. Patented Apr. 4, 1893.
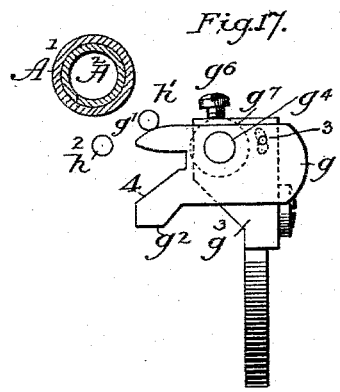
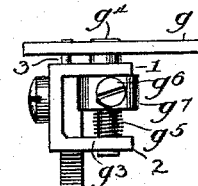
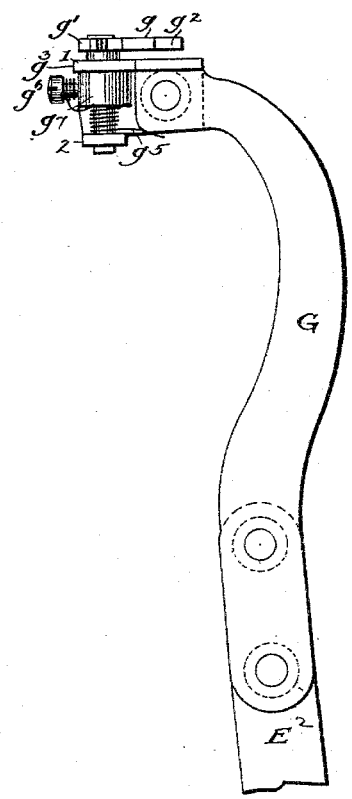
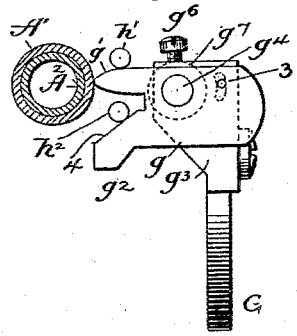
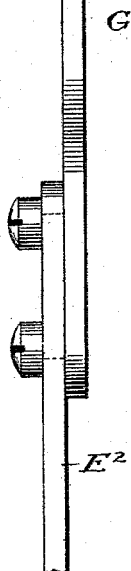
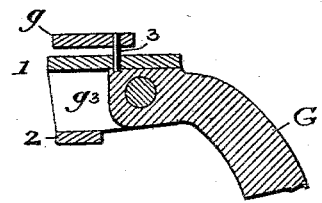
Witnesses:
C. A. Ferguson
Wm. M. Iliff
Inventor:
James B. Hammond
By his attorneys
Gifford & Brown United States Patent Office.

JAMES B. HAMMOND, OF NEW YORK, N. Y.

TYPE-WRITING MACHINE.

SPECIFICATION forming part of Letters Patent No. 494,742, dated April 4, 1893.

Application filed April 4, 1890. Serial No. 346,636. (No model.)

*To all whom it may concern:*

Be it known that I, JAMES B. HAMMOND, of New York, in the county and State of New York, have invented a certain new and useful Improvement in Type-Writing Machines, of which the following is a specification.

I will describe my improvement in connection with a type writer of the kind which has heretofore been put upon the market as the Hammond type writer, and, after doing so, I will point out the novel features in claims.

Figure 10:
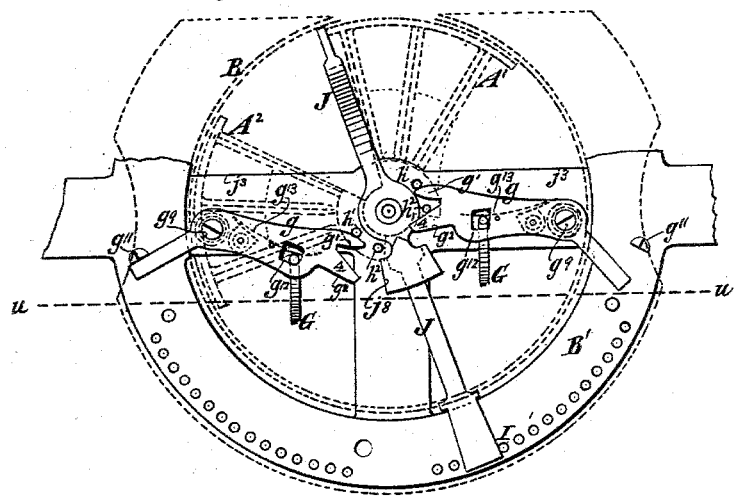
Figure 11:
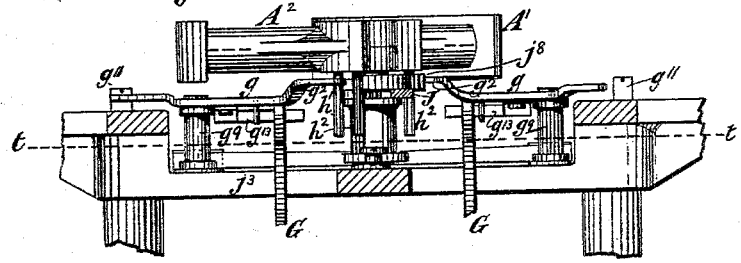
Figure 12:
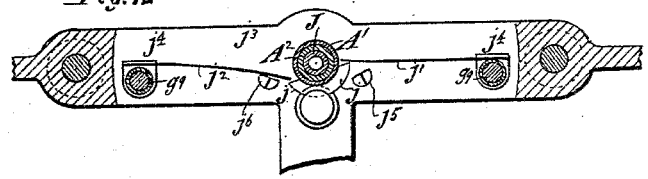
Figures 13, 14:
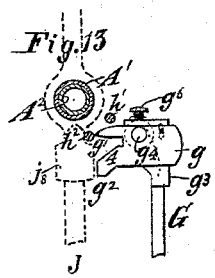

In the accompanying drawings, Figure 1 is a top view of a type writer embodying my improvement, some of the parts being broken away. Fig. 2 is a top view of a portion of the machine on a larger scale. Fig. 3 is an elevation of certain of the parts which are illustrated in Fig. 2 as seen when looking in the direction of the arrow $x$ which is adjacent to Fig. 2. Fig. 4 is an elevation, looking in the direction of the arrow $y$ Fig. 2, of what I term a vertical type wheel driver and its appurtenances. Fig. 5 is an elevation of the type wheel driver looking in the direction indicated by the arrow marked $z$ in Fig. 2. Fig. 6 is a top view of this type wheel driver and its appurtenances in the act of propelling a type wheel suitably to effect the printing of a letter corresponding to a key lever or finger key near the center of the bank of key levers. Fig. 7 is a top view of one of the type wheel drivers in the act of propelling a type wheel suitably to effect the printing of a letter corresponding to a key lever or finger key near the right hand end of the bank of key levers. Fig. 8 is a view similar to Fig. 7 except that it illustrates the condition of the driver at the completion of its forward stroke. Fig. 9 is a vertical section taken at the plane of the dotted line $w\ w$ Fig. 6. Fig. 10 is a top view of a portion of a machine of somewhat modified construction, certain parts being illustrated in dotted outline. Fig. 11 is a vertical section taken at the plane of the dotted line $u\ u$ Fig. 10. Fig. 12 is a horizontal section taken at the plane of the dotted line $t\ t$ Fig. 11 and showing principally a stop lever which arrests the movement of the type wheels and certain springs for returning the said lever to its normal position. Fig. 13 is a top view of one of the type wheel drivers included in that example of my improvement which is illustrated by Figs. 1 to 9 inclusive and it also shows the appurtenances thereof and the hub and pins of one of two type wheel segments. Fig. 14 is a similar view of the example of the improvement represented by Figs. 10, 11 and 12. Fig. 15 is an enlarged vertical section with some of the parts omitted. Fig. 16 is a horizontal section, mainly on the line 8. 8. of Fig. 15, with certain parts omitted. Figs. 17 to 22 inclusive are similar to Figs. 4 to 9 inclusive heretofore described but on an enlarged scale.

Similar letters and numerals of reference designate corresponding parts in all the figures.

I will briefly describe the general features of the type writer and refer more particularly to the novel features.

$A'\ A^2$ designate two type wheels or type wheel segments arranged within a cylinder B having an opening rearward of which are arranged an inking ribbon, a shield $i'$ for the ribbon $i$ provided with a hole opposite the axes of the type wheels or segments and a holder $I'$ for paper. Rearward of the hole in the ribbon shield is a hammer C which is operated by the movement of the key levers and other mechanism not necessary to be shown herein. The type wheels carry different letters of the alphabet and other symbols which are to be printed. They are moved one at a time into different positions to present different letters opposite to the hammer C. The hammer forces the paper against the inking ribbon at a point opposite the letter or symbol presented to the hole in the ribbon shield and thus the printing is done. The segment $A^2$ has a hollow hub or shaft $l$ mounted revolubly on a vertically movable shaft L and the segment $A'$ has a hollow hub or shaft $l'$ mounted revolubly on the shaft $l$. It will be seen that the lower ends of the shafts $l, l'$, rest upon an annular shoulder of the shaft L.

There are in the machine a number of key levers or finger keys D, which are fulcrumed on a bar $d$ and at the inner ends extend inwardly toward the center of the cylinder B. Horizontal arms E extend across all of the key levers excepting the center one and the one immediately to the right and the one immediately to the left of the center one. The center key lever is simply for spacing. The one to the right and the one to the left are simply for raising the type wheels or segments so as to present different horizontal portions opposite to the hole in the shield for the ribbon, as, for instance, for printing capitals or figures. Each of the arms E is for rotating or oscillating one of the type wheels. These arms E are secured to or formed with shafts E' having journal bearings $m$ and on these shafts E' are secured or formed arms $E^2$. The arms $E^2$ or prolongations of them form what are termed vertical drivers G for the type wheels or segments. In the present instance, I have shown the vertical drivers G made separately from the arms $E^2$ and fastened thereto by screws.

Each of the vertical drivers G is provided at its upper end with fingers $g'$ $g^2$. These fingers engage with pins $h'$ $h^2$ that project downwardly from the hub of the corresponding type wheels or segments $A'$ $A^2$. The pin $h^2$ of each type wheel extends down to operate between the fingers $g'$ $g^2$ of the corresponding vertical driver. The pin $h'$ of each type wheel will, when the parts occupy their normal positions, be in advance of the finger $g'$ of the corresponding vertical driver. When any of the key levers which are arranged near the center of the entire bank or series of key levers is depressed it will cause the finger $g'$ of the corresponding vertical driver to push against the pin $h'$ of the corresponding type wheel and so rotate or oscillate such type wheel, as illustrated in Fig. 6; but, when one of the key levers toward the extreme right or left of the entire bank or series of key levers is operated it will cause the finger $g^2$ of the corresponding vertical driver to push against the pin $h^2$ of the corresponding type wheel to supplement the action of the finger $g'$ on the pin $h'$ in rotating or oscillating the latter, as illustrated in Figs. 2, 7 and 8.

Before further describing the vertical drivers and their fingers, I will explain the manner in which the movement of the type wheels will be arrested. Each of the key levers D excepting only the center one and the one immediately to the right and the one immediately to the left, extends under a vertically movable pin I. The pins I are impelled downwardly by springs. On the depression of the outer end of the key levers corresponding to them, these pins will be raised to project in the path of a stop lever J, which is pivoted to a shaft whose axis is in line with the axes of the type wheels. Of course, as only one key lever will be depressed at a time only one of the pins I will be raised at a time to offer an obstruction to the movement of the stop lever. Each key lever by operating the corresponding pin I determines exactly the position to which the type wheel deriving motion from such key lever shall be moved, because when either type wheel is moved its advancing end will abut against one arm of the stop lever J and afterward oscillate this lever until its other arm shall be arrested by coming in contact with that pin I which shall have been raised by the key lever from which the motion of the type wheel is derived.

The shaft forming the fulcrum for the stop lever J will preferably be tubular in the present style of machine, as may be seen best by reference to Fig. 12. As shown, it has upon it a segmental flange $j$, against the extremities of which two flap springs $j'$ $j^2$ impinge; these springs being fastened to fixed supports on any suitable part of the machine, as, for instance, a cross bar $j^3$. The springs may advantageously be fastened to clips $j^4$ mounted on the bar $j^3$. Near their free ends they extend across pins or screws $j^5$ $j^6$, which are fitted in the bar $j^3$ and have flattened portions. The purpose of these pins or screws is to limit the movement of the springs in their forward direction. By rotating the pins or screws they may be made to vary the position to which the springs may move forwardly. It is a function of the springs $j'$ $j^2$ to return the stop lever quickly to its normal position after it shall have been moved out of its position by means either of the type wheels or segments.

On the stop lever J is a projection $j^8$ which in the present instance is shown as made in the form of a block which is fastened by rivets or otherwise to that arm of the stop lever which extends forwardly, or, in other words, toward the operator. Preferably this block will be made of hard rubber or similar material so as to be light. It projects between the extremities of the opposite pairs of fingers $g'$ $g^2$. Owing to this projection or block, one of the fingers of each pair will serve to return the stop lever to its normal position if the corresponding one of the springs $j'$ $j^2$ should fail to do this. Moreover, one of each pair of fingers will always form a stop to limit the return movement of the stop lever under an impulse from one of the springs $j'$ $j^2$, and when neither of the pair of fingers $g'$ $g^2$ is in motion, the two pairs of fingers will serve as a lock to hold the stop lever in its normal position.

When either of the drivers G is at rest and the corresponding fingers $g'$ $g^2$ are stationary, the end of the fingers $g'$ will be close to one side of the pin $h^2$ of the corresponding type wheel segment, as illustrated in Fig. 13. This type wheel segment cannot then be moved because the finger $g'$ will be in its way, and any force brought to bear upon the finger through the said finger $h^2$ will be in the direction of the length of the finger and hence the finger cannot yield to this force, and allow the movement of the type wheel segment. This feature is important because by reason of it whichever type wheel ought to remain at rest at any time will be prevented from deriving movement by friction or otherwise from the other type wheel segment.

Of course the last described function of each finger $g'$ is dependent upon the position which the drivers G assume when at rest.

This position is determined by means of a wire or rod R against which the drivers bear when moved forward. This wire or rod is secured to the fixed part of the machine by means of a screw R' and consequently is adjustable to regulate the positions which the drivers G will assume on coming to rest.

The object of my present improvement is to provide for maintaining the type carrier in position for a longer time during the depression and release of each key lever to insure the proper printing of that one of its letters or symbols which is presented to the action of the hammer. This is a desideratum because of the very great rapidity with which the key levers are operated by proficient operators. To accomplish my object I have a spring connection between each vertical driver and the spring fingers thereof. One of the fingers of each vertical driver is also peculiarly shaped to conduce to the desired result.

I will now explain in connection with Figs. 1 to 9 inclusive, the particular way in which I have provided the spring connection between each vertical driver and the fingers thereof. At the top of each vertical driver is a bracket $g^3$ which may be formed integral therewith or attached thereto. This bracket has two arms 1 and 2, in which an upright shaft $g^4$ is journaled. On the top of the shaft is affixed a plate $g$ and the fingers $g'$ $g^2$ are formed integral with this plate. A lug or pin, 3, extending downwardly from this plate into a groove formed in the upper arm, 1, of the bracket $g^3$ and in the shape of an arc concentric with the axis of the shaft $g^4$, limits the motion of the plate $g$. A spring $g^5$ is employed to oscillate the shaft as far as it can move in such direction as to throw the fingers forward. This spring, however, allows of the yielding of the fingers backward. The spring $g^5$ is shown as a coiled spring having one end connected with the shaft and the other bearing against the bracket. The end which is connected with the shaft is connected by a screw $g^6$, which passes through a collar $g^7$ and impinges against the shaft. The collar serves to prevent the shaft from moving upward out of the bracket and a shoulder which is formed above the upper arm of the bracket $g^3$ prevents the downward movement of the shaft. When either of the vertical drivers is moved forward it propels the corresponding type wheel and has such a range of movement that after the movement of the type wheel shall have been arrested by the stop lever, the vertical driver may move sufficiently far forward to cause an oscillation of the plate $g$ on the axis of the shaft $g^4$. This oscillation will occur because when the type wheel is arrested the pin $h'$ or $h^2$ which happens to be in engagement with one of the fingers $g'$ or $g^2$ belonging to the said vertical driver will be precluded from further forward movement. When the movement of the vertical driver is reversed owing to the release of the key lever whereby it was operated, the vertical driver will fail, during its initial rearward movement, to impart any movement to the type wheel because it will have no effect upon the type wheel until after it shall have moved sufficiently far rearward to allow the plate $g$ to oscillate into its normal position. After this, the continued rearward movement of the vertical driver will cause the finger $g'$ of such driver to act upon the pin $h^2$ of the type wheel and pull it back. An appreciable time will be consumed by the extra movement of the vertical driver after effecting the oscillating movement of the plate $g$ and on the return or backward movement of the driver by a corresponding extra movement up to that point when the plate $g$ has completely resumed its normal position. Thus a dwell in the movement of the type wheel after the presentation of a letter or symbol is secured. By this dwell I insure proper printing, as by it the momentum and consequently the rebound of the type wheel is overcome. It will be observed that there is an incline, 4, on the forward face of the finger $g^2$ of each vertical driver. This incline I have found of great advantage in securing the most effective operation of the type wheel under impulses from said finger $g^2$.

Turning now to the modified construction illustrated in Figs. 10, 11 and 12, it will be seen that the plates $g$ are not supported by the vertical drivers G but are merely propelled or carried thereby, and are supported by pillars $g^9$ $g^{10}$ which are erected upon the cross bar $j^3$. The fingers $g'$ $g^2$ of each of the plates are thus made to oscillate upon the axes of the said pillars as centers. As in the other example of my improvement they will be in a plane to co-act with the projection or block $j^3$ of the stop lever J. The forward movement of the plates $g$, or, in other words, that movement which is toward the ends of the key levers that are manipulated by the operator is to be limited by any suitable stops. In the present instance, the plates $g$ are made in the form of levers and the arms which extend beyond the supporting pillars contact with stops $g^{11}$ which are inserted in a frame B' through which the stop pins I move vertically. The stops $g^{11}$ are preferably made in the form of screws and have flattened portions so that by rotating them they may be made to vary the limiting effect which they have upon the movement of the plates $g$ and consequently of the fingers $g'$ $g^2$. It will be noticed that the fingers $g^2$ in this example of my improvement as well as in that first described have inclined faces, 4, which operate upon the pin $h^2$ on the type wheels or segments. The plates $g$, it will be observed, are slotted intermediately of the supporting pillars $g^9$ $g^{10}$ and the fingers $g'$ $g^2$. The drivers have at their upper extremities upwardly extending pin-like projections which enter slots $g^{12}$. At the under side of the plates $g$ flap springs $g^{13}$ consisting of strips of steel are at one end attached. These extend across the rear of the vertical drivers G and normally hold the pin-like projections of the latter against the forward sides of the slots $g^{12}$ in the plates $g$. The slots $g^{12}$ are much larger than the said pin-like projections of the vertical driver. Consequently, after the vertical drivers shall have moved the plates $g$ as far rearward or, in other words, toward the hammer C, as is possible, the vertical drivers are capable of moving still farther forward as the springs $g^{13}$ will then yield to allow of this. This extra movement of the vertical drivers and the corresponding returning movement which the vertical drivers will have before imparting any forward movement to the plates $g$ will produce a dwell as in the first described example of my improvement.

When the plates $g$ in the last described example of my improvement come to rest their fingers $g'$ will be at the sides of the pins $h^2$ of the type wheel segments as may be understood by reference to Fig. 14. Owing to this, the fingers $g'$ will form stops to prevent the accidental movement of the type wheel segments. The importance of the stops $g^{11}$ will be appreciated when it is understood that by means of them the fingers $g'$ may be made to come to rest in the proper position with reference to the pins $h^2$ of the type wheel segments.

Although in each example of my improvement I have shown pairs of fingers combined with the vertical drivers, it may be in some forms of the invention, necessary to employ but one finger in connection with each driver.

It will be seen that in each example of my improvement there is provided a spring or elastic connection intermediate of the finger end of the key levers or keys and a type bearer. This is of the essence of the principal feature of my improvement and I desire to cover such a spring or elastic connection wherever it may be located intermediate of the two points named, although I regard the location illustrated in the drawings preferable to any other.

What I claim as my invention, and desire to secure by Letters Patent, is—

1. In a type writer the combination of a type bearer, a type driver and a spring intermediate of the type-bearer and type driver whereby the type will maintain its position at rest before an impression is made and during a further depression and the release of the type driver, substantially as specified.

2. In a type writer, the combination of a type bearer, a driver for the same and a yielding pair of fingers moved by the type driver and engaging the type wheel or segment; one of said fingers having an inclined face on that side or edge which is opposite the other finger, substantially as specified.

3. In a type writer, the combination of a type bearer, a pair of fingers imparting motion thereto, a type driver supporting and carrying the fingers and a spring intermediate of the type driver and fingers, substantially as specified.

4. In a type writer, the combination of a type bearer, a finger having an inclined face imparting motion thereto, a type driver supporting and carrying the finger and a spring intermediate of the type driver and finger, substantially as specified.

5. In a type writer, the combination of a type bearer, a type driver, a finger carried by the type driver and co-acting with the type wheel or segment, said finger being connected with the type driver by an elastic connection, substantially as specified.

6. In a type writer, the combination of a type bearer, a type driver, a pair of fingers carried by the type driver and co-acting with the type wheel or segment, said fingers being connected with the type driver by an elastic connection, substantially as specified.

7. In a type writer, the combination of a type bearer, a type driver, a shaft journaled at the upper end of the type driver, a finger secured to said shaft and a spring connected to the shaft and type driver, substantially as specified.

8. In a type writer, the combination of a type bearer, a type driver, a shaft journaled at the upper end of the type driver, a pair of fingers secured to said shaft and a spring connected to the shaft and type driver, substantially as specified.

9. In a type writer, the combination of a type bearer, a type driver, a shaft journaled at the upper end of the type driver, a finger secured to said shaft, a spring connected to the shaft and type driver and a stop for limiting the movement of the finger and shaft relatively to the driver, substantially as specified.

10. In a type writer, the combination of a type bearer, a type driver, a shaft journaled at the upper end of the type driver, a pair of fingers secured to said shaft, a spring connected to the shaft and type driver and a stop for limiting the movement of the fingers and shaft relatively to the driver, substantially as specified.

11. In a type writer, the combination of a type bearer provided with projections or pins, fingers for imparting movement to the said projections or pins and occupying when at rest a position with their extremities to one side of and close to the projections or pins and adjustable stops for determining the positions which the said fingers assume when at rest, substantially as specified.

JAMES B. HAMMOND.

Witnesses:
S. O. EDMONDS,
C. R. FERGUSON.